United States Patent [19]

Samulowitz et al.

[11] Patent Number: 5,957,362
[45] Date of Patent: Sep. 28, 1999

[54] DEVICE FOR FITTING RIVETS OR CONTROL THEREFOR

[75] Inventors: Helmut Samulowitz; Manfred Hardt, both of Stolberg, Germany

[73] Assignee: William Prym GmbH & Co. KG, Stolberg, Germany

[21] Appl. No.: 08/945,095

[22] PCT Filed: Apr. 4, 1996

[86] PCT No.: PCT/EP96/01475

§ 371 Date: Oct. 15, 1997

§ 102(e) Date: Oct. 15, 1997

[87] PCT Pub. No.: WO96/34541

PCT Pub. Date: Nov. 7, 1996

[30] Foreign Application Priority Data

May 4, 1995 [DE] Germany .......................... 195 16 345

[51] Int. Cl.[6] .................................................. B21J 15/28
[52] U.S. Cl. .................................. 227/2; 227/30; 227/31
[58] Field of Search ................................. 227/2, 4, 8, 30, 227/31, 37, 1, 15; 192/143, 142 R

[56] References Cited

U.S. PATENT DOCUMENTS

| | | | |
|---|---|---|---|
| 4,161,649 | 7/1979 | Klos | 235/92 |
| 4,246,523 | 1/1981 | Nagai | 192/142 R |
| 4,343,423 | 8/1982 | Sauermilch | 227/1 |
| 4,547,692 | 10/1985 | Spaulding | 318/592 |
| 4,625,850 | 12/1986 | Marsh | 192/143 |
| 4,741,466 | 5/1988 | Birkhofer | 227/2 |
| 5,115,735 | 5/1992 | Gloe | 100/43 |

FOREIGN PATENT DOCUMENTS

| | | |
|---|---|---|
| 2505380 | 8/1976 | Germany . |
| 3819090 | 12/1989 | Germany . |
| 2040507 | 8/1980 | United Kingdom . |

*Primary Examiner*—Peter Vo
*Assistant Examiner*—James P. Calve
*Attorney, Agent, or Firm*—Martin A. Farber

[57] ABSTRACT

An apparatus for attaching rivets, buttons or the like to textiles or the like, having a plunger which performs the riveting stroke and whose upward and downward movement is controlled by the interaction of the top end of the plunger with a cam plate rotationally driven by an electric motor, the apparatus performing a sequence of attachments upon actuation of a switch or the like, the electric motor (39) running at a fixed preset angular velocity being stopped briefly in the top dead-center position of the plunger (24) by a braking device or the like in order to reduce the cycle frequency of the plunger stroke. To this end, the control unit switches off the drive motor (39) in the top dead-center position of the plunger for a preprogrammed time and switches it on again after the preprogrammed waiting time has expired and actuates a brake in particular during the waiting time.

9 Claims, 17 Drawing Sheets

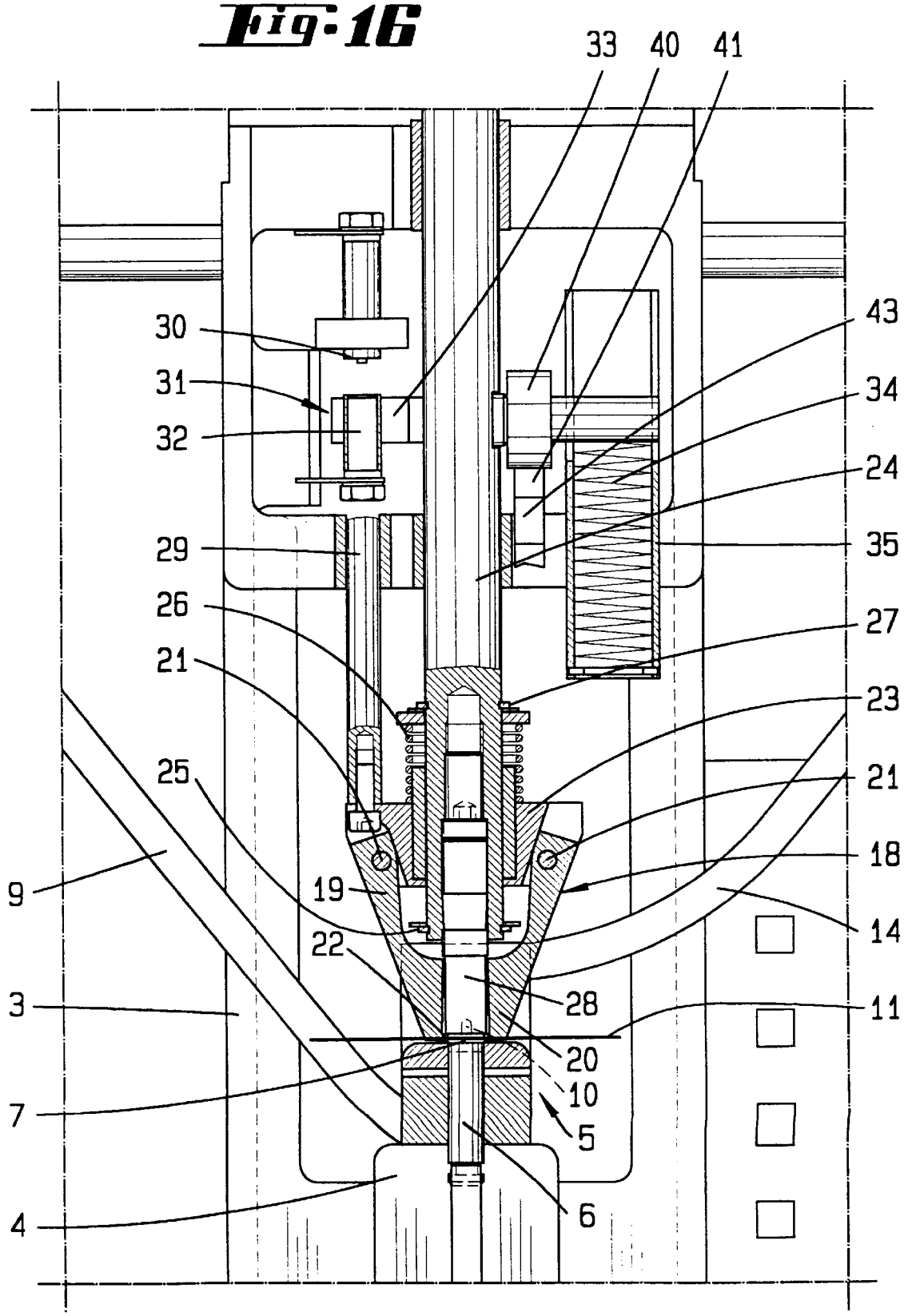

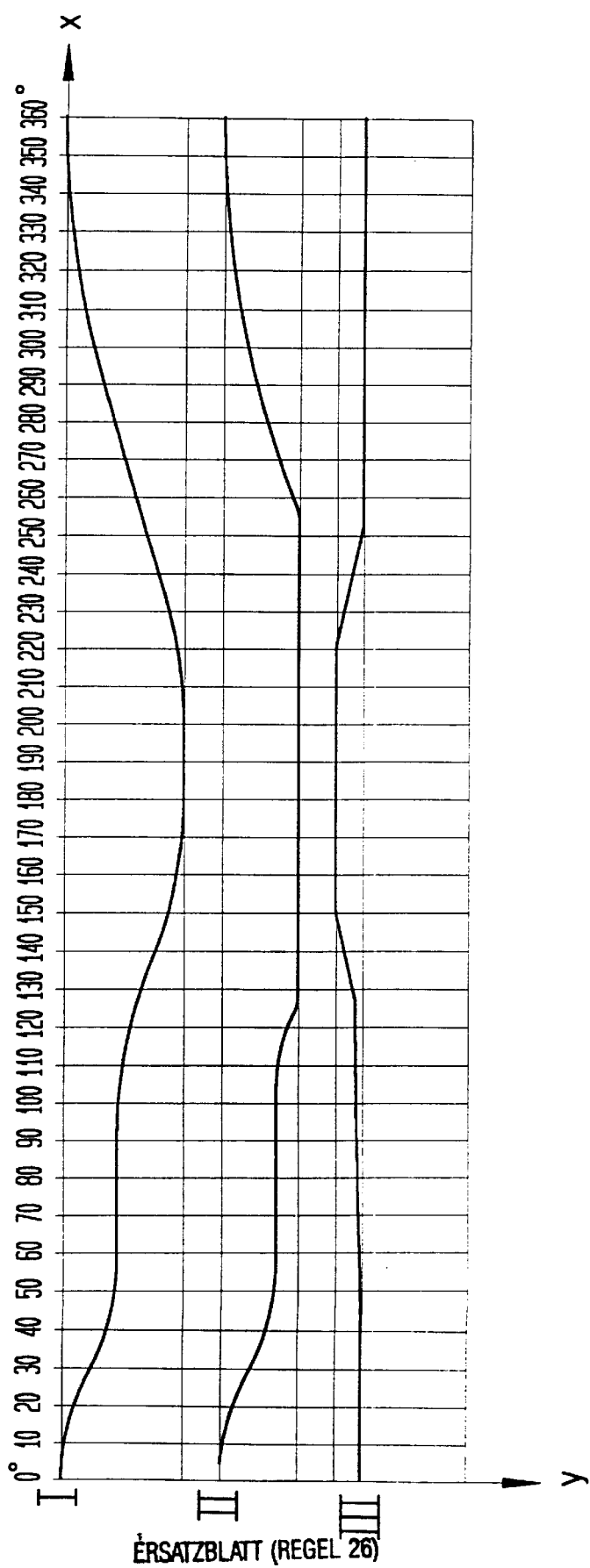

DEVICE FOR FITTING RIVETS OR CONTROL THEREFOR

FIELD AND BACKGROUND OF THE INVENTION

The invention relates to an apparatus for attaching rivets, buttons or the like as well as to a control for such an apparatus.

Attaching machines for attaching rivets, buttons or the like are known in the prior art. As a rule, there is a bottom tool and a bottom tool in such machines. A plunger is associated with the top tool. The plunger interacts with a cam plate. The shape of the curve on the cam plate determines the course of movement of the plunger. The cam plate is driven by an electric motor, and the movement sequence per unit of time, in particular the cycle rate of the plunger stroke, is determined by the rotational speed of the electric motor. As a rule, the known attaching apparatuses have finger protection; the latter consists of a feeler element which senses whether an object, in particular a finger, is lying between the top tool and the textile. If such an object is sensed there, a brake which stops the motor comes into action immediately, so that the plunger pauses on its path of movement.

If a multiplicity of rivets or the like are to be attached within a sequence by such a known attaching apparatus, a switch, in particular a foot switch, is actuated, which causes the motor to start up. The cycle rate is determined by the rotational speed of the motor. In many cases, it is desirable to influence, in particular reduce, the cycle rate. In the case of machines of the prior art, the motor can be made to run at a correspondingly slower speed for this purpose. This is accompanied by a reduction in the downward speed of the plunger and thus influences the riveting speed. Consequently, the quality of the riveting or attachment is not uniform.

SUMMARY OF THE INVENTION

The object of the invention is to develop an apparatus of the present type in a functionally advantageous manner.

As a result of the present invention, an apparatus is provided in which the plunger is always displaced downward at the same preset speed irrespective of the cycle rate. The cycle rate is now set by a brief stoppage of the apparatus at the top dead centre of the plunger position. In this case, the waiting time of the drive is in the range of milliseconds. The motor is preferably driven by an electronic control unit which determines the motor position, in particular the top dead-centre position of the plunger, by sensor means or the like. If the drive reaches the top plunger position, the electronic control unit immediately interrupts the motor current supply and brakes the motor. An eddy-current brake or a friction brake may be provided for braking the motor. After the waiting time has passed, the braking action is neutralized and the current supply to the motor is started again. The electronic control unit may contain a microprocessor or a microcontroller. A key input is provided. To this end, an upcount key and a downcount key may be provided in the electronic control part. By actuation of the said keys in a prescribed program menu, the waiting time can be set in steps. The step size is preferably 10 milliseconds. The waiting time can preferably be set in a range of 0–990 milliseconds. Furthermore, the electronic control unit may contain counters. In this case, a first counter can count the attachments effected in a sequence. A second counter serves to indicate the total number of working strokes performed by the apparatus. The indication may be effected via an electronic display. Furthermore, provision is made according to the invention for the electronic control unit to be likewise able to program the rated motor current. In a prescribed program menu, the motor can be adapted by key actuation to the main power supply voltage available at the place of installation. Provision is also made for a multiplicity of different articles to be attached one after the other in a prescribed order within one attaching sequence. If the articles lie at different spacings apart on the textile, provision may also be made for an individual waiting time to be allocated to each working stroke within a sequence. The articles are fed to the top and to the bottom tool via known conveying and feeding devices.

BRIEF DESCRIPTION OF THE DRAWINGS

With the above and other objects and advantages in view, the present invention will become more clearly understood in connection with the detailed description of a preferred embodiment, when considered with the accompanying drawings of which, FIG. 16 shows the associated enlarged detail of FIG. 15 in the region of the tools, and FIG. 17 shows a movement graph for the plunger, the holding gripper and the bottom tool.

DETAILED DESCRIPTION OF THE PREFERRED EMBODIMENT

Figure 1:
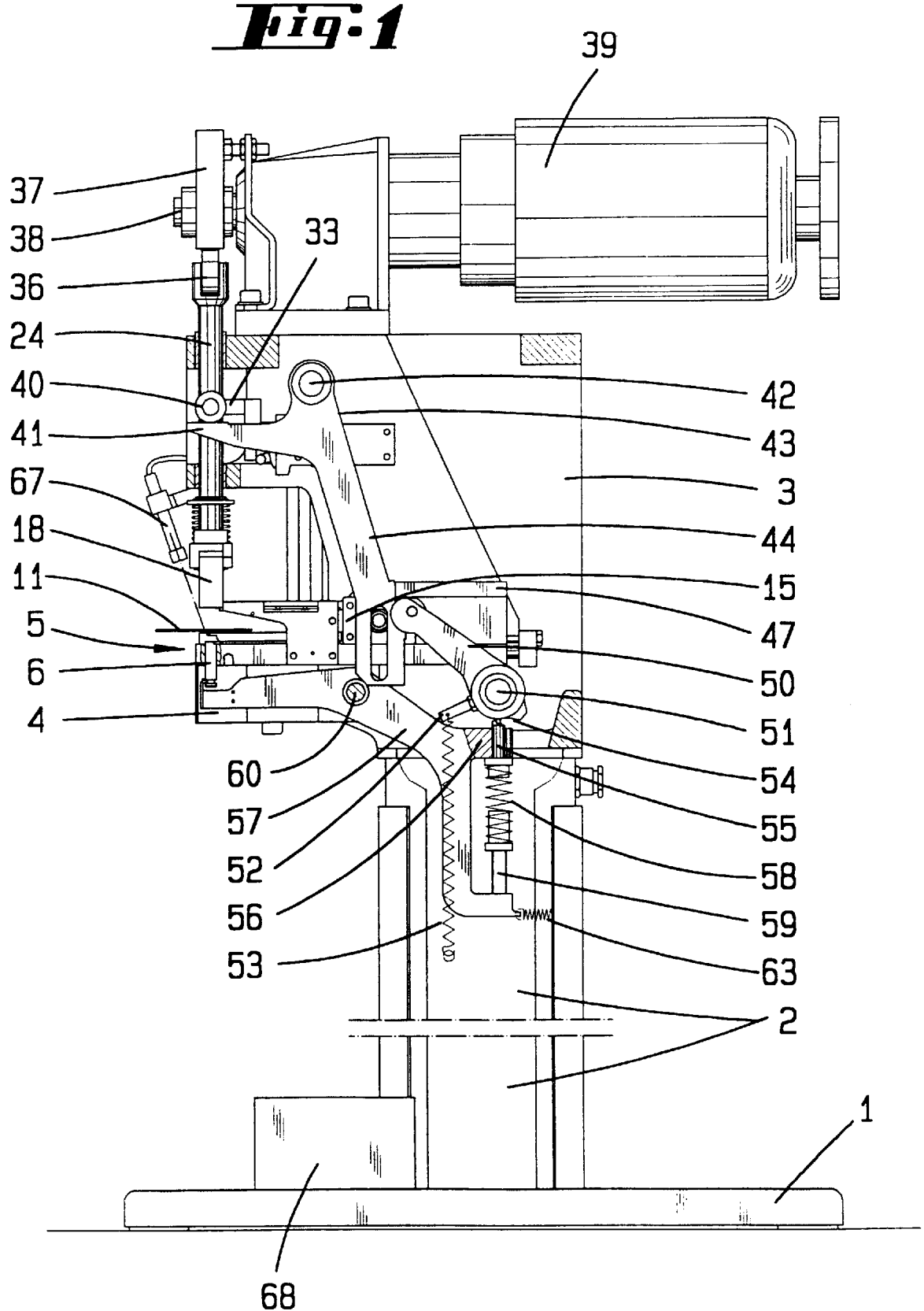
FIG. 1 shows, partly in side view and partly in horizontal section, the apparatus in the top dead-centre position of the plunger.
Figure 2:
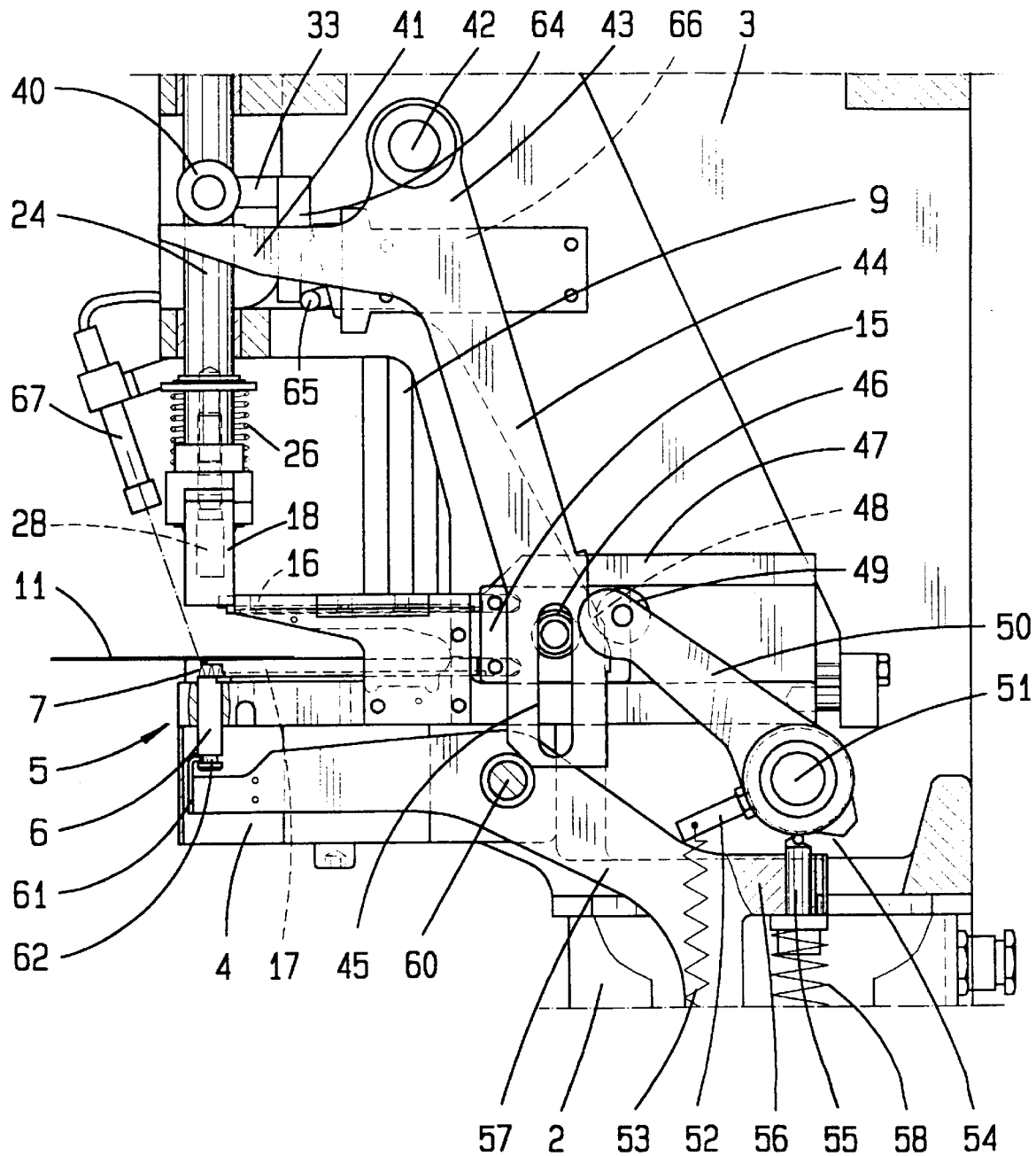
FIG. 2 shows a detail of the apparatus in the region of the bottom tool and of the top tool, likewise in the top dead-centre position of the plunger.

The apparatus provided in the form of a machine has a vertically oriented column 2 carried by a base plate 1. The column 2 is the support for a mounting plate 3. The latter has a U-shape which is tilted anticlockwise through 90° and whose bottom U-leg represents a bracket 4. At its free end, the latter holds a bottom tool 5. The latter has an anvil 6 of circular cross-section, the top end of which accommodates an article bottom part 7.

The article bottom parts 7 are stored in a magazine 8 which is arranged at the side of the mounting plate 3 and from which a parts feed rail 9 starts in a direction obliquely downward towards the bracket 4. The article bottom parts 7 are holding parts which are provided with serrations and can be connected to two different article top parts. The one article top part 10 is shown. It serves as a functional part and can be attached with the article bottom part 7 to a textile 11. Both article top parts of different configuration pass from magazines 12, 13 opposite the magazine 8 via a common parts feed rail 14 into the region of a loading slide 15. The latter is horizontally displaceable and is provided with a top push-in strip 16 and a bottom push-in strip 17. The top push-in strip in each case puts an article top part 10 into a holding gripper 18, whereas the bottom push-in strip 17 moves the article bottom parts 7 into a position in alignment with the anvil 6 of the bottom tool 5. By means of an electromagnetic control (not illustrated), either the one or the other article top part 10 can be put into the range of movement of the top push-in strip 16.

In the initial position of the apparatus, the holding gripper 18 extends in alignment with and opposite to the bottom tool 5. The holding gripper 18 is formed by two gripper jaws 19, 20 which are displaceable at their top ends about pins 21. A tension spring (not shown) loads the gripper jaws 19, 20 against one another. At their bottom end, the gripper jaws 19, 20 form a receptacle 22 for an article top part 10. The article top part is put into this receptacle 22 by means of the top push-in strip 16. The pins 21 and thus the holding gripper 18 are carried by a sliding piece 23 which is guided on the bottom end of a plunger 24 extending opposite the bottom tool 5. The downward movement of the sliding piece 23 is limited by a radial shoulder 25 at the bottom end of the plunger 24. A helical compression spring 26 surrounding the plunger 24 above the sliding piece 23 loads the holding gripper 18 in the downward direction. The top end of the helical compression spring 26 is likewise supported on a radial shoulder 27 of the plunger 24, which radial shoulder is arranged at a spacing from the bottom radial shoulder 25. The helical compression spring 26 serves as a finger-protection spring and, if the holding gripper comes down, for example, onto a finger extending between the holding gripper and the bottom tool, prevents the finger from being injured by the holding gripper. At its bottom end, the plunger 24 carries a top tool 28, which, in the top dead-centre position of the plunger according to FIGS. 1–4, ends above the receptacle 22 for the article top part 10.

Furthermore, the sliding piece 23 carries a push rod 29 which projects above it and is guided in the mounting plate 3. The top end of the push rod 29 is fitted with a contact 30 of a switch 31. The top contact 30 interacts with a bottom contact 32 of the switch 31. The switch 31 is activated in the top dead-centre position, indicated in FIGS. 1–4, of the plunger 24, which means that both contacts 30, 32 move towards one another. The top contact 30 contains a compression spring (not illustrated) which loads the contact projection in the direction of the contact projection of the bottom contact 32. In this case, limited displaceability of the top contact projection is provided. The bottom contact 30 is carried by a bracket 33 secured to the plunger 24. A compression spring 34 is supported on the bracket 33 opposite the contact 32, which compression spring 34 is in turn arranged in a sleeve 35 on the machine-frame side.

The plunger 24 carries a running roller 36 at the top end. Under the action of the compression spring 34, the running roller 36 moves against the peripheral running surface of a cam plate 37. The latter is keyed in position on the drive shaft 38 of an electric-motor, drive 39. During a 360° rotation of the cam plate 37, the plunger 24 is accordingly displaced in the downward direction and again in the upward direction up to the top dead-centre position. In the top dead-centre position, the motor can be stopped briefly by means of a brake. If a plurality of attachments are to be carried out in a sequence in one operation, the machine operating continuously for a single actuation of the foot switch, provision is made for the brake to stop the drive in the dead-centre position in order thus to reduce the cycle rate.

Furthermore, the bracket 33 carries a control roller 40. An arm 41 of a lever 43 mounted on the mounting plate 3 about the hinge pin 42 moves against the underside of the control roller 40. In obtuse-angled orientation relative to the arm 41, the lever 43 forms a lever arm 44 directed obliquely downward. Its end runs vertically according to the position in FIGS. 1–4 and is provided there with a vertical slot 45 in which a sliding block 46 engages. The sliding block 46 is connected to the carriage-form loading slide 15, which in turn is displaceable in a carriage guide 47 on the machine-frame side when the lever 43 is pivoted. The bottom end of the lever arm 44 forms a control edge 48 on which a feeler roller 49 is supported. The latter is located at the free end of a control lever 50. The latter is mounted about a bolt 51 on the machine-frame side. Acting on a crossarm 52 of the control lever 50 is a tension spring 53 which loads the control lever 50 in the direction of a contact position relative to the lever 43. Accordingly, the latter is forced with its arm 41 into a contact position relative to the control roller 40 of the plunger 24.

Opposite the feeler roller 49, the control lever 50 forms a control cam 54 which is arranged close to the bolt 51 and interacts in turn with a rotationally locked feeler pin 55 which is guided in a laterally projecting crossarm 56 of a transmission lever 57. The feeler pin 55 is supported via a transmission compression spring 58 on a counter-bolt 59, adjustable by screw thread, at the bottom end of the transmission lever 57, which is roughly of angular configuration. At the angle vertex, the transmission lever 57 is mounted about a transverse pin 60 on the bracket side. The free end of the transmission lever 57 extends below the bottom tool 5. With an angle piece 61, the transmission lever 57 engages in a positive-locking manner in an annular groove 62 at the bottom end of the anvil-shaped bottom tool 5. A restoring spring 63 acting close to the counter-bolt 59 loads the transmission lever 57 in such a way that its feeler pin 55 is supported on the control lever 50, specifically according to FIGS. 1–4 in the region in front of the control cam 54.

Furthermore, the bracket 33 is a support for a control strip 64 which interacts with the momentary-contact actuator 65 of a bridging switch 66 secured on the machine-frame side.

A projection lamp 67 helps to attach the article parts to the textile accurately. This projection lamp 67 is secured on the machine-frame side and produces a reticule, for example, on the top side of the textile.

The electronic control unit for drive of the electric motor 39 is not shown in the drawings. It consists of an electronic circuit in which known digital-electronic modules are combined with one another in a known manner. A microcontroller or a microprocessor and the associated interface modules may be provided. Input/programming keys are provided. Furthermore, an indicating device in the form of a display is provided. The number of attaching operations taking place in a sequence can be input with the electronic control unit. Furthermore, it is possible for the waiting time during which the drive motor stops in the top plunger position to be input step-by-step. Up count/down count keys are provided for this purpose. The waiting time can be adjusted in ten-millisecond steps, specifically in a range of 0–990 milliseconds, by actuating these two keys. The total number of working strokes performed by the apparatus can be shown on the display. To this end, a counter is provided in the electronic control unit. Provided in the electronic control unit is a second counter in which the working strokes performed within a cycle are recorded. The respective number can then likewise be indicated on the display. Furthermore, the electronic control unit has an adjusting means with which the respective rated motor current can be set.

The mode of operation is as follows:

According to FIGS. 1–4, the plunger 24 assumes the top dead-centre position on account of the correspondingly rotated cam plate 37. An article top part 10 has been passed to the holding gripper 18 by the top push-in strip, while the bottom push-in strip 17 has put the article bottom part 7 into the bottom tool 5.

Figure 3:
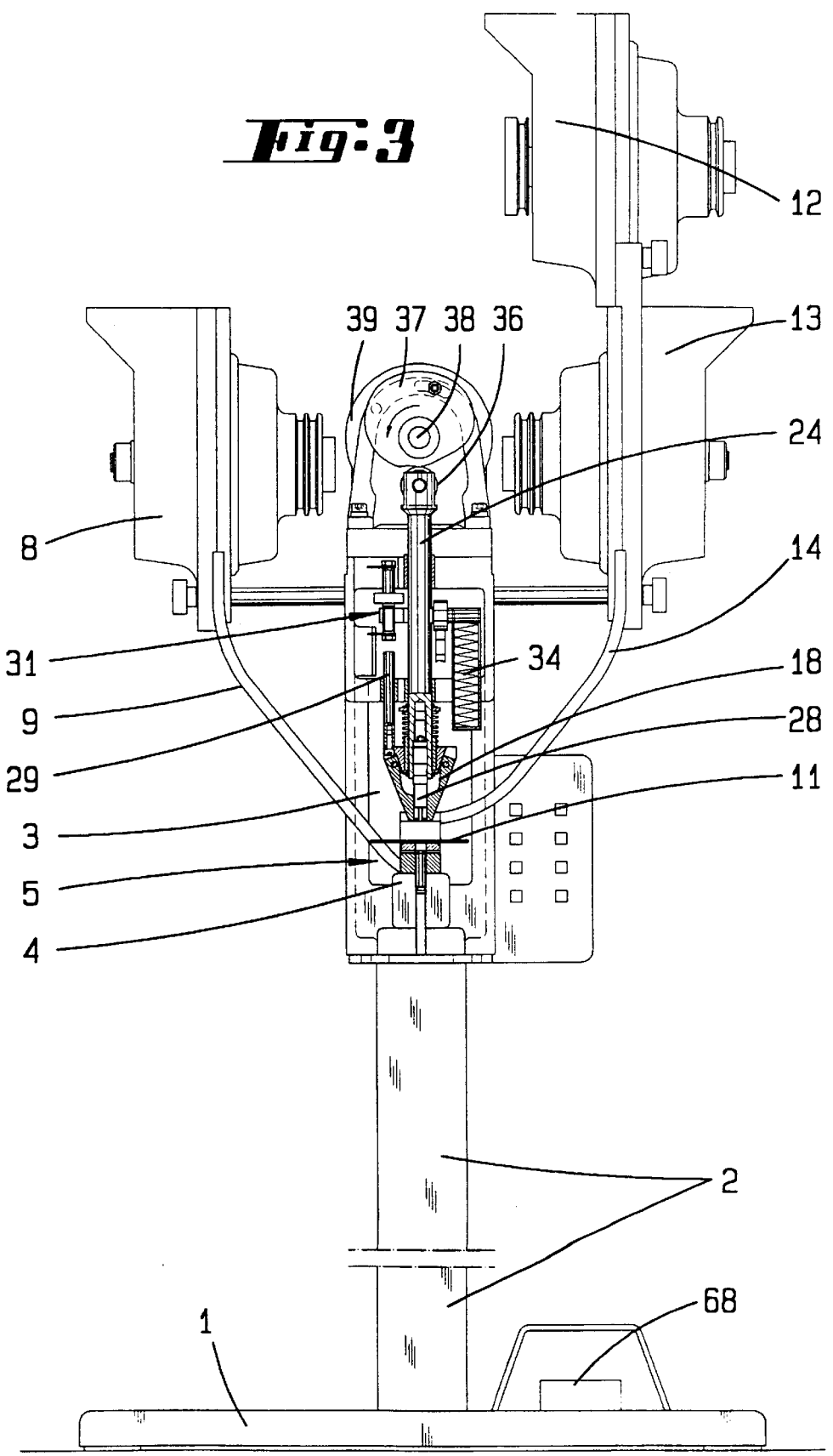
FIG. 3 shows a front view of FIG. 1, the magazines also being shown.
Figure 4:
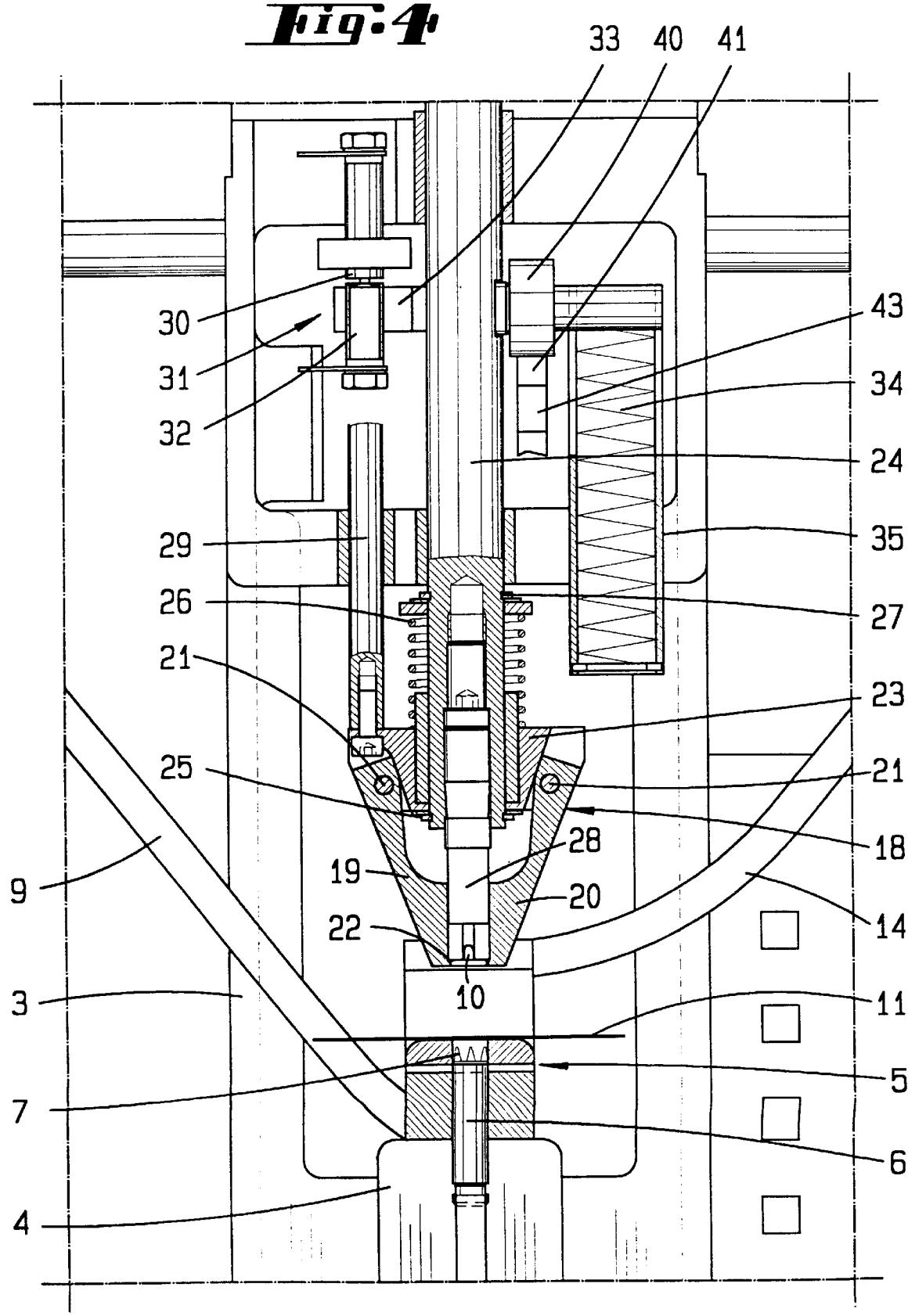
FIG. 4 shows, partly in front view and partly in vertical longitudinal section, the apparatus in accordance with the top dead-centre position of the plunger.
Figure 5:
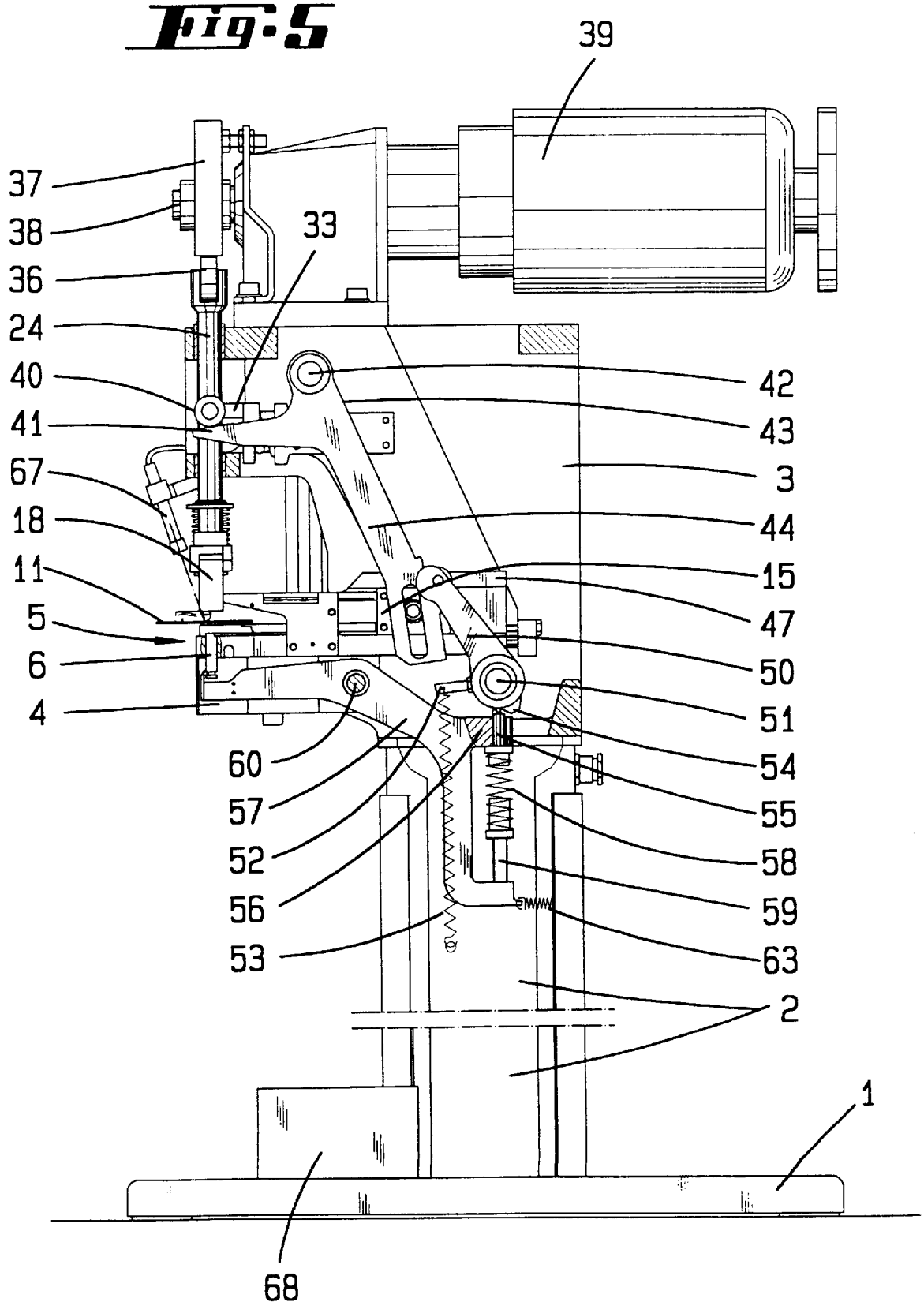
FIG. 5 shows a representation corresponding to FIG. 1, the holding gripper and plunger having been displaced in the downward direction when an operator's finger extends between holding gripper and textile.
Figure 6:
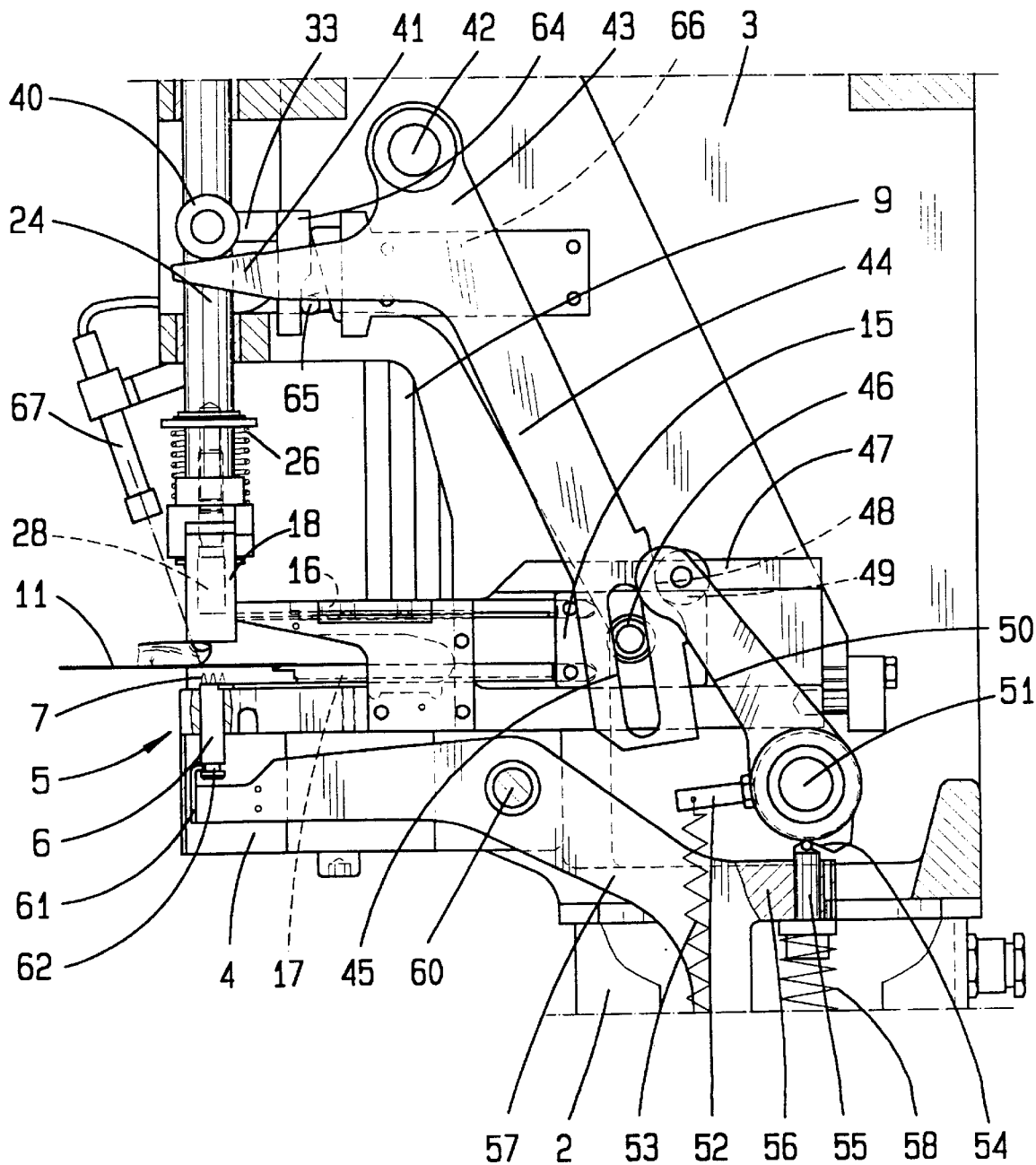
FIG. 6 shows the corresponding detail, enlargement in this position.
Figure 7:
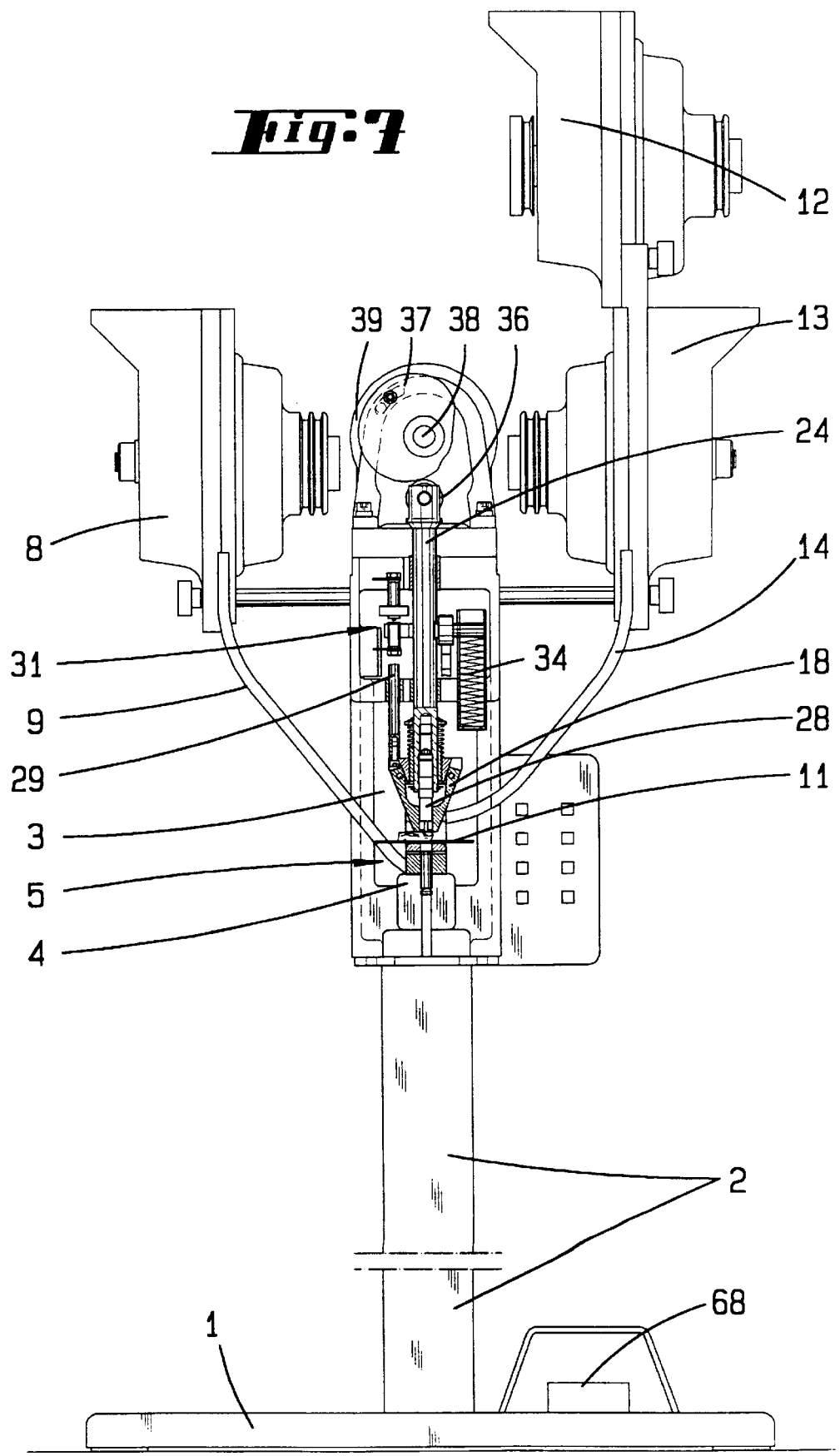
FIG. 7 shows the front view of the apparatus according to this position of the holding gripper.
Figure 8:
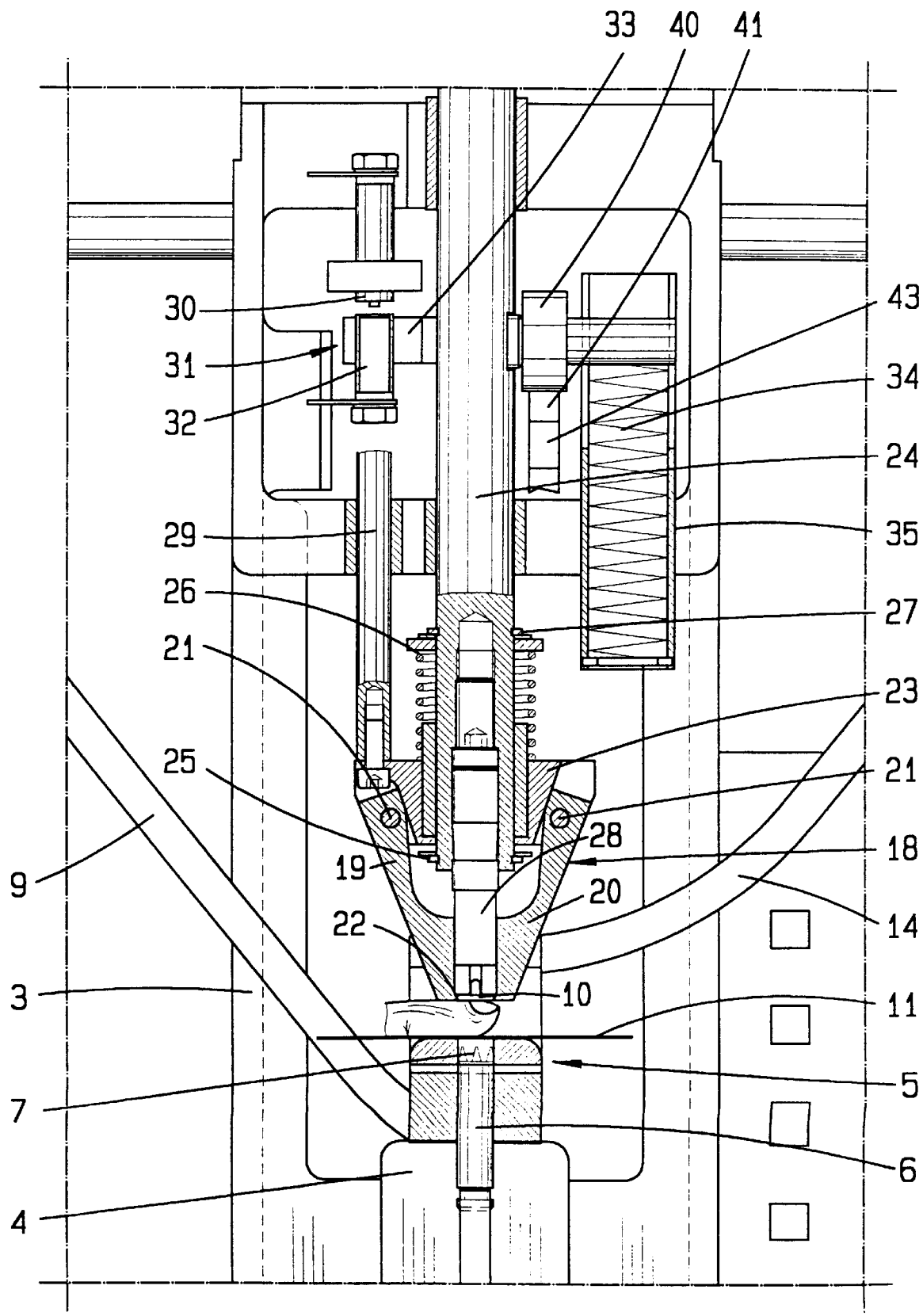
FIG. 8 shows the enlarged detail of the front view in the region of the tools, likewise with a finger extending between holding gripper and bottom tool.
Figure 9:
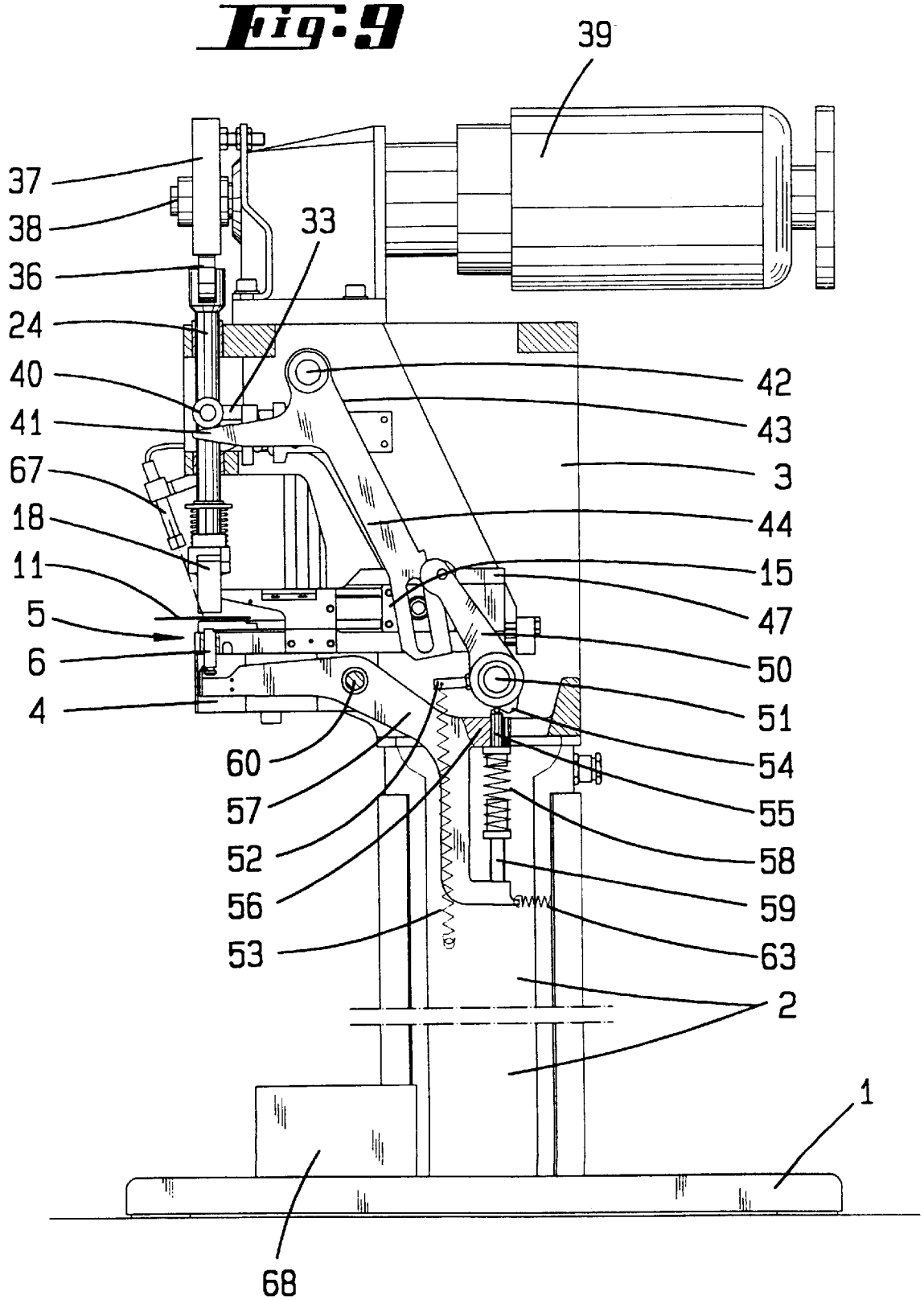
FIG. 9 shows a representation analogous to FIG. 1 after a first lowering movement of the holding gripper has been carried out to reach the clearance position relative to the bottom tool.
Figure 10:
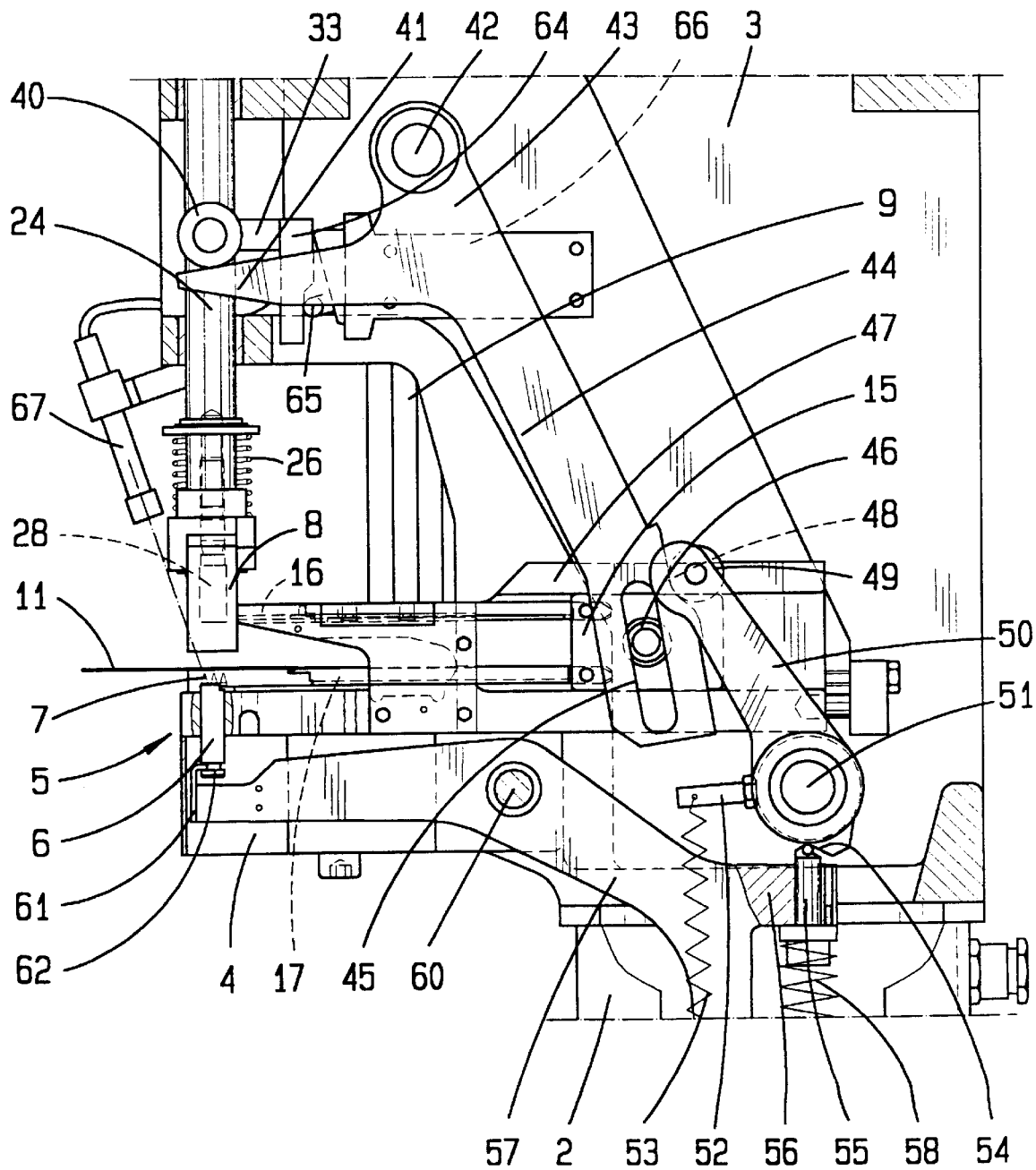
FIG. 10 shows, in an enlarged detail of FIG. 9, the clearance position of the holding gripper relative to the bottom tool.
Figure 11:
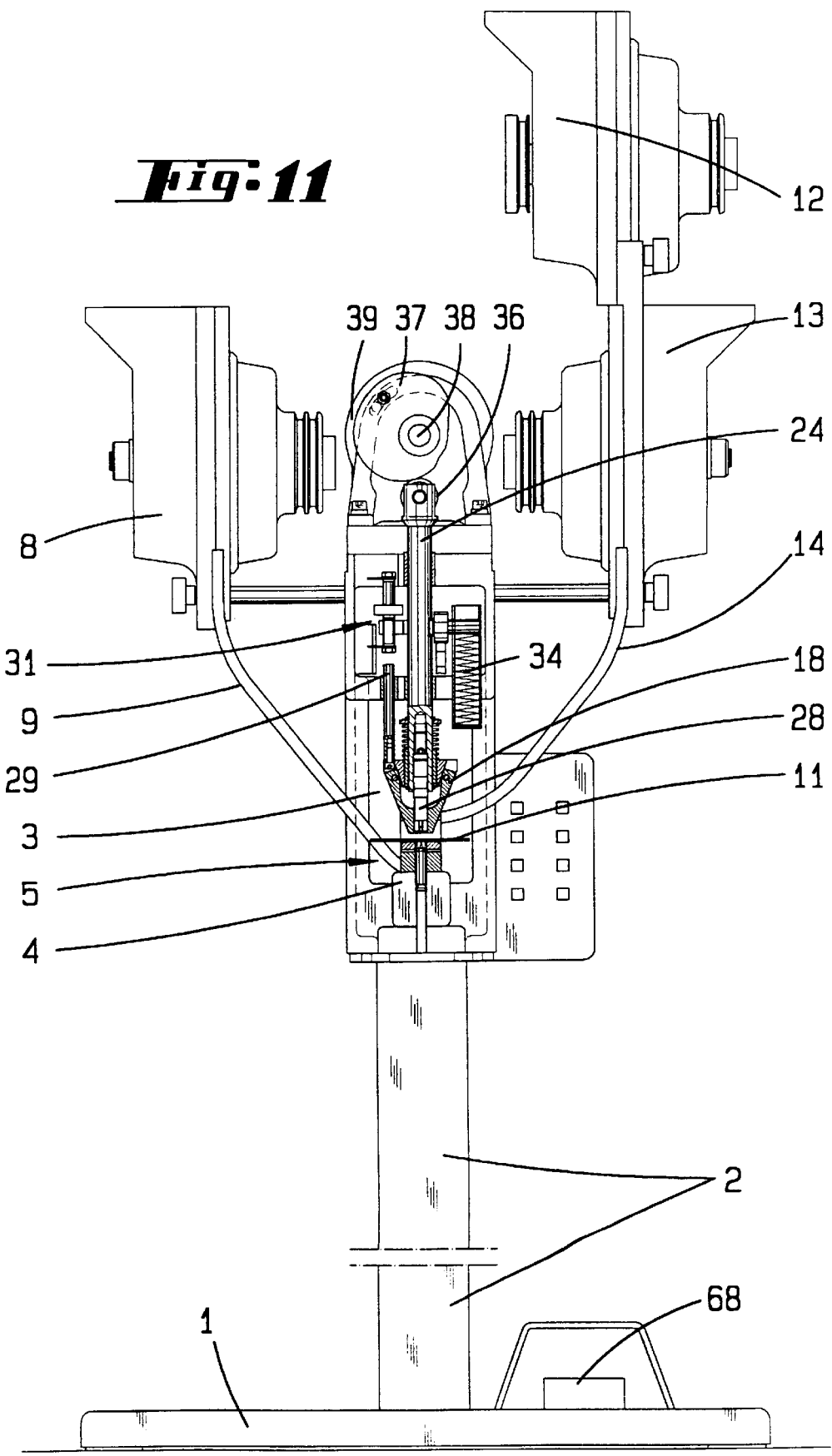
FIG. 11 shows a representation corresponding to FIG. 3, the holding gripper having reached its finger-protection clearance position.
Figure 12:
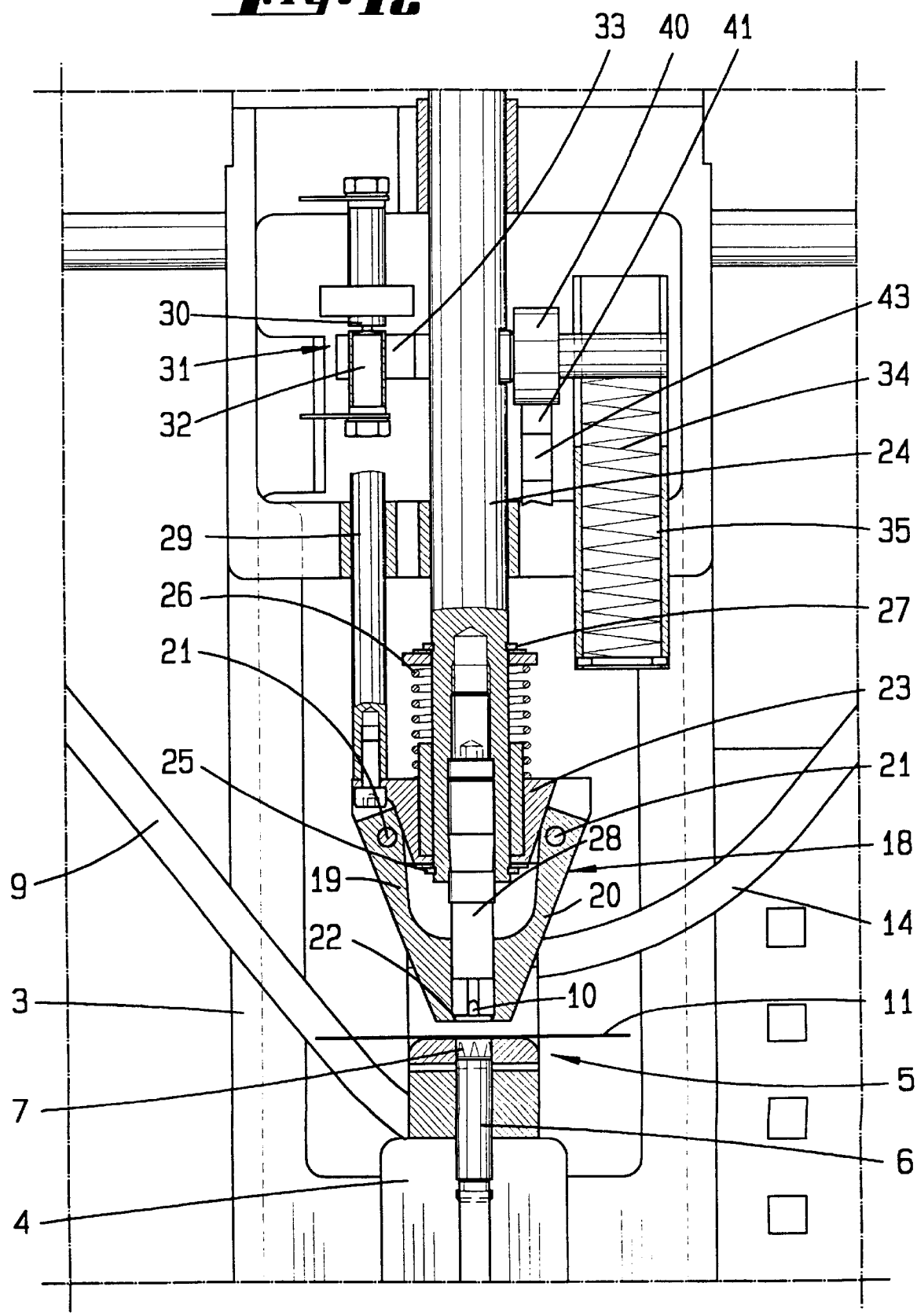
FIG. 12 shows the enlarged detail of FIG. 11 in the region of the tools.
Figure 13:
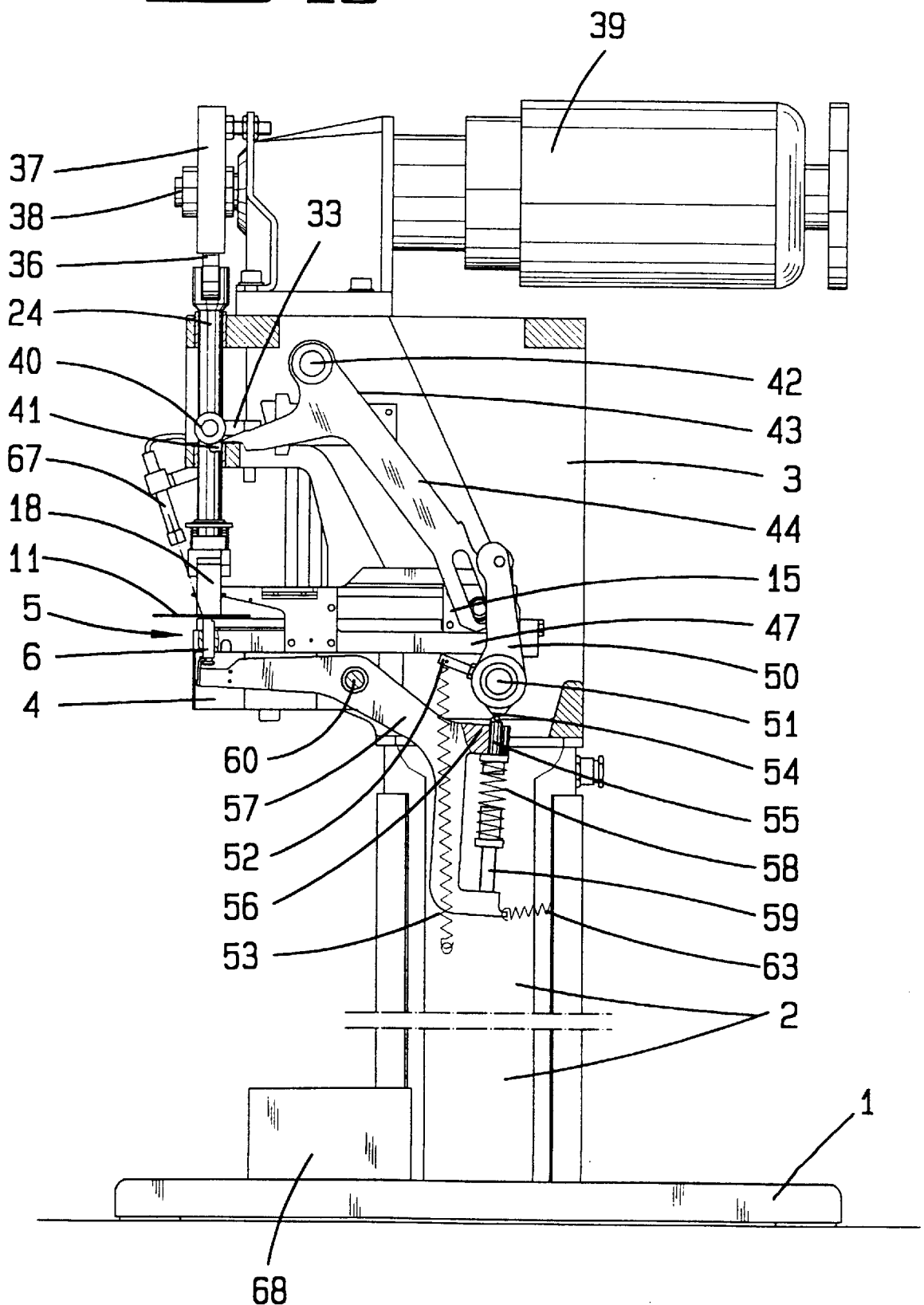
FIG. 13 shows the representation corresponding to FIG. 1, but with tools assuming the riveting position.
Figure 14:
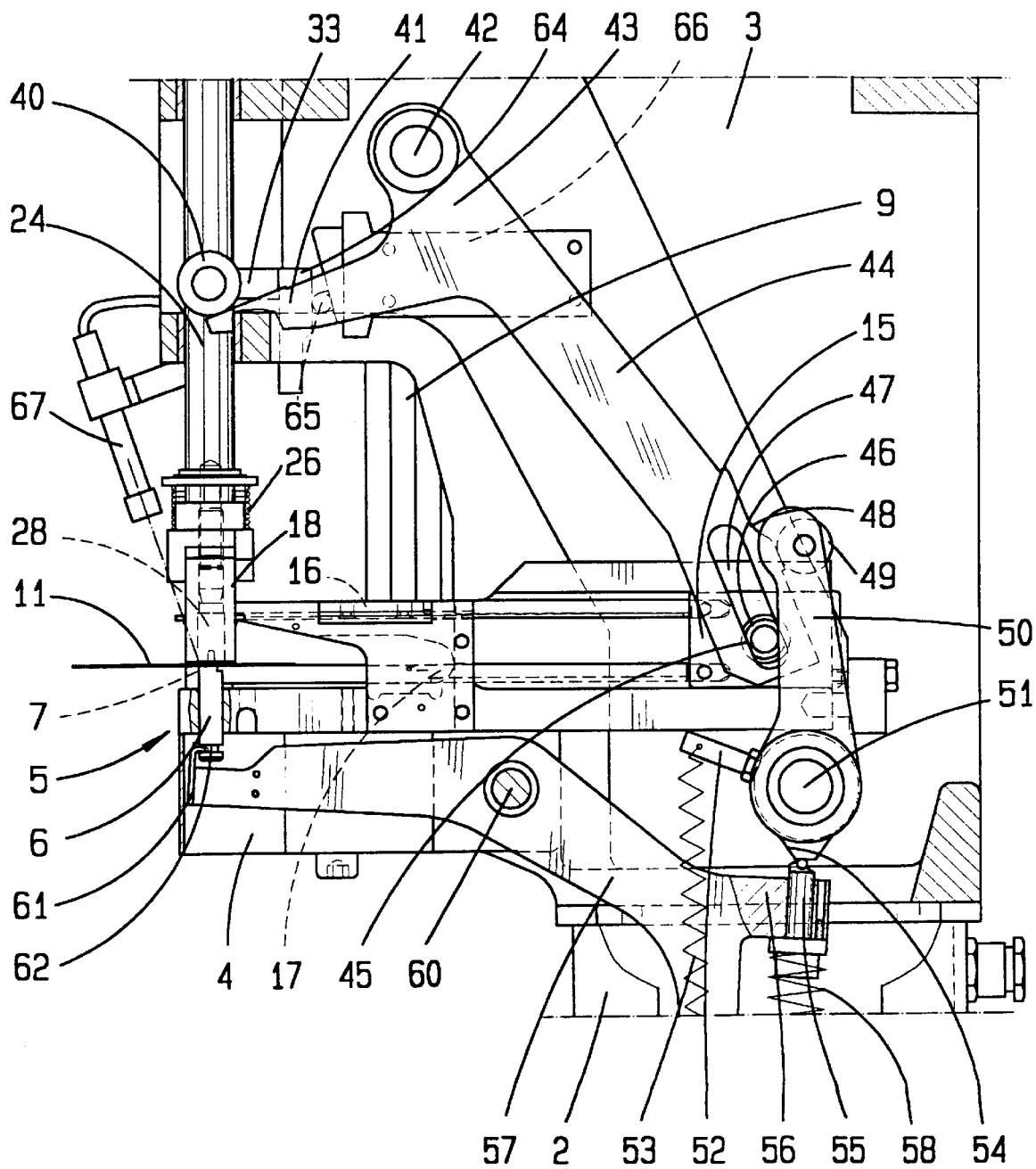
FIG. 14 shows the enlarged detail of FIG. 13 in the region of the tools.
Figure 15:
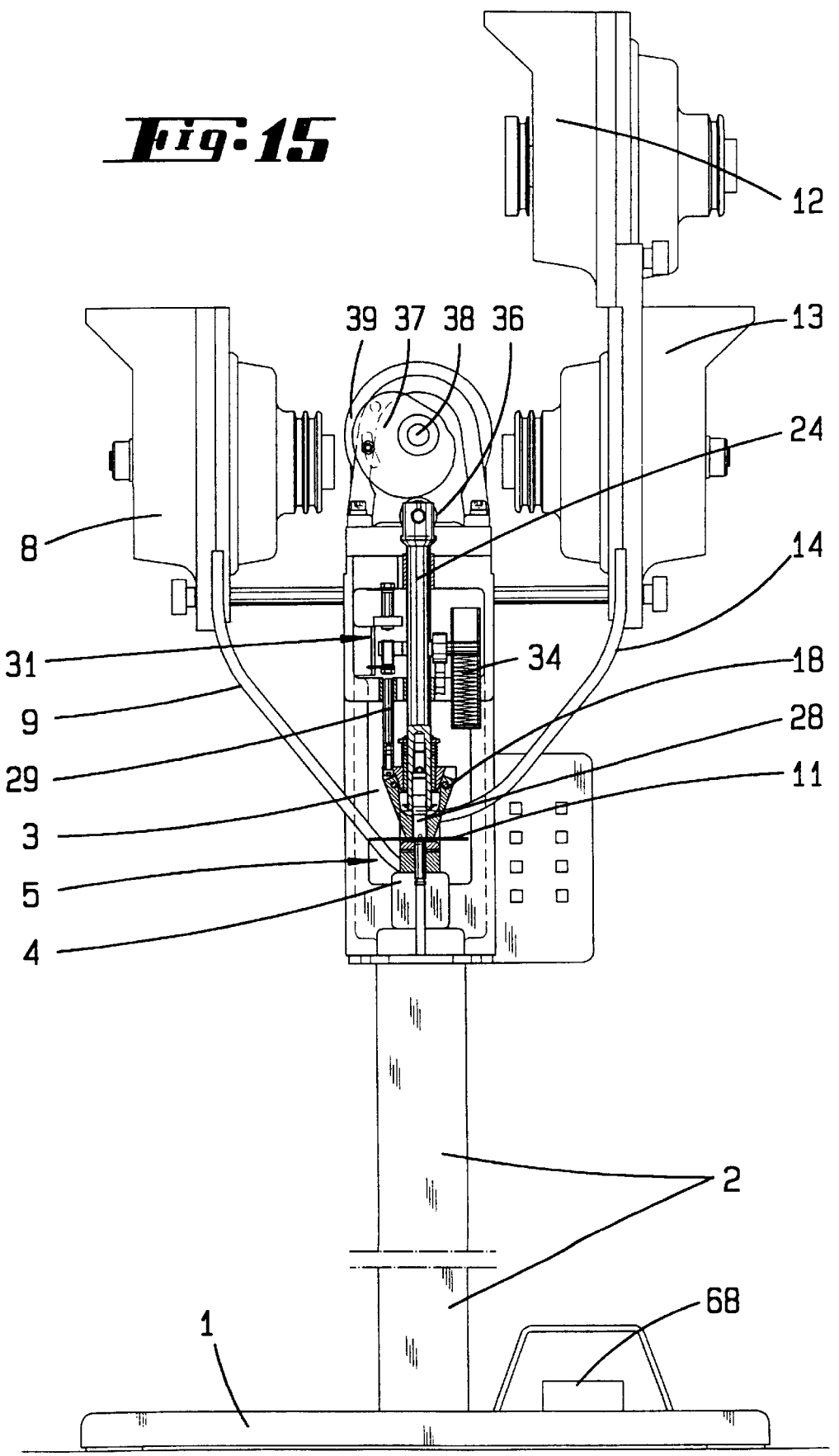
FIG. 15 shows the front view of the apparatus, partly sectioned, in the riveting position.

By actuation of a foot switch 68 located on the base plate 1, the drive starts in combination with a rotation of the cam plate 37 in the arrow direction according to FIG. 3. The plunger 24 is thereby displaced in the downward direction. It is apparent from the movement graph according to FIG. 17 that the plunger (see plunger curve I) stops after a 60° rotation of the control cam. This stoppage extends approximately up to the 90° position of the control cam 37. The holding gripper 18 has been displaced with an identical movement in the downward direction; in this respect see the holding-gripper curve II in FIG. 17. The holding gripper 18 is therefore in a clearance position relative to the bottom tool 5, which clearance corresponds to about 4–5 mm and is thus less than the thickness of a finger, cf. in this respect FIGS. 9–12. The contacts 30, 32 of the switch 31 remain closed, since no relative displacement has taken place between holding gripper and plunger 24.

However, a situation may arise in which the finger of an operator extends between the bottom tool 5 and the holding gripper 18, cf. FIGS. 5–8. Accordingly, the holding gripper 18 comes down on the finger and stops, while the plunger 24 is displaced further in the downward direction. As a result of the displacement of the plunger 24 relative to the holding gripper 18 which then occurs, the contacts 30, 32 of the switch 31 open and immediately stop the drive. The motor is braked for this purpose. During this relative displacement of holding gripper 18 and plunger 24, the helical compression spring 26 is loaded only to a negligible degree, so that there is no risk of injury to the finger.

Accompanying the downward movement of the plunger 24, the control roller 40 acts upon the arm 41 of the lever 43 and pivots the latter anti-clockwise while driving the loading slide 15 having the push-in strips 16, 17 sitting thereon. During this action, the lever arm 44 of the lever 43 acts upon the feeler roller 49 of the control lever 50 and pivots the latter along in the clockwise direction such that the feeler pin moves against the control cam 54. The transmission lever 57 is thereby pivoted via the transmission spring 58 so that an upward movement of the bottom tool 5 occurs approximately at the same time as the holding gripper 18 and the plunger 24 stop. The bottom-tool curve III shows the upward movement of the bottom tool with a slight rise, which starts at around 50° and ends at around 130°, relative to the rotation of the cam plate 37.

When a 90° rotary position of the cam plate 37 is reached, the second lowering movement of the plunger 24 and thus of the holding gripper 18 occurs. The latter comes down onto the top side of the textile 11, while the plunger 24 moves further in the downward direction. According to the movement graph, the holding gripper comes down at around 125°. The plunger moving further downward leads to a relative displacement between holding gripper 18 and plunger 24 in combination with opening of the switch 31. Nonetheless, the drive is not stopped, since the bridging switch 66 on the machine-frame side is actuated by the control strip 64. This is done by the plunger at the start of the second lowering movement, so that the drive is not interrupted despite open contacts 30, 32 of the switch 31. The article bottom part 7 is riveted to the article top part 10 in the range between 180° to 200° rotation, see FIGS. 13–16. The movement graph in FIG. 17 indicates by the bottom-tool curve III that a steeply rising upward movement takes place following the gently rising upward positioning movement up to about 125° rotation of the cam plate 37. In the process, the serrations of the article bottom part 7 pierce the textile 11. The highest position of the bottom tool 5 is then held approximately over 70° for a 360° rotation of the cam plate 37, the riveting of the button parts also taking place at the same time. Furthermore, in the riveting position, the loading slide 15 has been displaced to such an extent that the push-in strips 16, 17 lie in front of the article parts fed and are put into the tools when the cam plate 37 continues to rotate.

In the 360° position, the electric motor stops for a preset waiting time. After the waiting time lying in the millisecond range has passed, the working cycle of the plunger according to FIGS. 1–4 starts again. The motor is finally switched off only if the foot switch is no longer actuated during a sequence of a multiplicity of working cycles or if the finger protection is activated. Otherwise, the motor stops automatically when the number of working cycles belonging to a sequence has been executed.

Provision may be made for various articles to be arranged one after the other in the bottom or top tool, so that different articles are attached one after the other within a sequence. Provision may be made for an individual waiting time to be allocated to each article or to each cycle of a sequence.

It may also be mentioned that, when the holding gripper 18 comes down onto the textile 11, the downward displacement of the plunger 24 forces the downward displacement of the article top part 10 via the top tool, which article top part 10 forces the gripper jaws 19, 20 to spread against spring loading via appropriate slopes arranged on the gripper jaws 19, 20 after the receptacle 22.

Furthermore, the switch 31 closes with the downward movement of the plunger, while the bridging switch 66 opens.

We claim:

1. Apparatus for attaching rivets and buttons to textiles, comprising:

an electric motor;

a cam plate rotationally driven by the electric motor;

a plunger disposed for performing a riveting stroke cycle by completing an upward and downward movement, said movement being controlled by interaction of a top end of the plunger with said cam plate, wherein a course of travel of the plunger brings the plunger through a top dead-center position of the plunger;

switch means for activating the apparatus to perform a sequence of cycles of attachments;

means comprising an electronic control unit, operative during a running of the motor, for energizing the motor, and for briefly switching off the electric motor each cycle from running at a fixed preset angular velocity upon attainment of the top dead-center position of said plunger to increase the cycle time of the riveting stroke cycle, the top dead-center position of the plunger being at the beginning of a downward movement of the plunger in a riveting stroke; and braking means for stopping said electric motor when said electronic unit switches off the electric motor, the electronic control unit establishing a preprogrammed cycle time and waiting time for each cycle and, upon attainment of the preprogrammed waiting time, releasing the braking means and switching the motor on again;

whereby the waiting time and the cycle time are adjustable while maintaining acceleration of the plunger independent of the cycle time during each of a succession of riveting strokes.

2. Apparatus according to claim 1, wherein the control unit has an upcount key and a downcount key, wherein by actuation thereof the waiting time is settable in stepwise manner.

3. Apparatus according to claim 2, wherein the waiting time is settable in ten-millisecond steps in a range of 0–990 milliseconds.

4. Apparatus according to claim 1, wherein the electronic control unit has a microcontroller or microprocessor.

5. Apparatus according to claim 1, wherein
the electronic control unit has a first counter for indicating attachments carried out in an attaching sequence and a second counter for indicating the total number of working strokes performed by the apparatus.

6. Apparatus according to claim 1, wherein rated motor current is programable by means of the electronic control unit.

7. Apparatus for attaching rivets and buttons to textiles, comprising:

an electric motor;

a cam plate rotationally driven by the electric motor;

a plunger disposed for performing a riveting stroke cycle by completing an upward and downward movement, said movement being controlled by interaction of a top end of the plunger with said cam plate, wherein a course of travel of the plunger brings the plunger through a top dead-center position of the plunger;

switch means for activating the apparatus to perform a sequence of cycles of attachments;

means comprising an electronic control unit, operative during a running of the motor, for energizing the motor, and for briefly switching off the electric motor each cycle from running at a fixed preset angular velocity prior to a down stroke of said plunger, the top dead-center position of the plunger being at the beginning of a downward movement of the plunger in a riveting stroke; and braking means for stopping said electric motor when said electronic control unit switches off the electric motor, the electronic control unit establishing a preprogrammed cycle time and waiting time for each cycle and, upon attainment of the preprogrammed waiting time, releasing the braking means and switching the motor on again;

whereby the waiting time and the cycle time are adjustable while maintaining acceleration of the plunger independent of the cycle time during each of a succession of riveting strokes.

8. A method for attaching rivets and buttons to textiles, comprising:

operating an electric motor at a constant speed for rotationally driving a cam plate;

employing the cam plate to operate a plunger, the plunger being disposed for performing a riveting stroke cycle by completing an upward and downward movement, said movement being controlled by interaction of a top end of the plunger with said cam plate, wherein a course of travel of the plunger brings the plunger through a top dead-center position of the plunger;

by means of an electric control unit, operative during a running of the motor, energizing the motor and subsequently briefly switching off the electric motor each cycle from running at a fixed preset angular velocity upon attainment of the top dead-center position of said plunger, the top dead-center position of the plunger being at the beginning of a downward movement of the plunger in a riveting stroke; and stopping the motor by a braking means when said electronic control unit switches off the electric motor, the electronic control unit establishing a preprogrammed cycle time and waiting time for each cycle and, upon attainment of the preprogrammed waiting time, releasing the braking means and switching the motor on again;

whereby the waiting time and the cycle time are adjustable while maintaining acceleration of the plunger independent of the cycle time during each of a succession of riveting strokes.

9. A method for attaching rivets and buttons to textiles, comprising:

operating an electric motor at a constant speed for rotationally driving a cam plate;

employing the cam plate to operate a plunger, the plunger being disposed for performing a riveting stroke cycle by completing an upward and downward movement, said movement being controlled by interaction of a top end of the plunger with said cam plate, wherein a course of travel of the plunger brings the plunger through a top dead-center position of the plunger;

by means of an electric control unit, operative during a running of the motor, energizing the motor and subsequently briefly switching off the electric motor each cycle from running at a fixed preset angular velocity prior to a downstroke of said plunger, the top dead-center position of the plunger being at the beginning of a downward movement of the plunger in a riveting stroke; and stopping the motor by a braking means when said electronic control unit switches off the electric motor, the electronic control unit establishing a preprogrammed cycle time and waiting time for each cycle and, upon attainment of the preprogrammed waiting time, releasing the braking means and switching the motor on again;

whereby the waiting time and the cycle time are adjustable while maintaining acceleration of the plunger independent of the cycle time during each of a succession of riveting strokes.

\* \* \* \* \*